(12) United States Patent
Gupta

(10) Patent No.: US 10,909,543 B2
(45) Date of Patent: Feb. 2, 2021

(54) AUTHORISATION MANAGEMENT SERVER FOR MANAGING AN AUTHORISATION CODE, RELATED COMPUTER PROCESS AND DEVICE NETWORK

(71) Applicant: MASTERCARD INTERNATIONAL INCORPORATED, Purchase, NY (US)

(72) Inventor: Ashutosh Kumar Gupta, Uttar Pradesh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 87 days.

(21) Appl. No.: 16/162,359

(22) Filed: Oct. 16, 2018

(65) Prior Publication Data

US 2019/0147445 A1 May 16, 2019

(30) Foreign Application Priority Data

Nov. 10, 2017 (SG) .......................... 10201709272Q

(51) Int. Cl.
*G06Q 10/02* (2012.01)
*G06Q 50/30* (2012.01)
(Continued)

(52) U.S. Cl.
CPC .......... *G06Q 20/409* (2013.01); *G06Q 10/02* (2013.01); *G06Q 20/382* (2013.01);
(Continued)

(58) Field of Classification Search
CPC ....... G06Q 50/14; G06Q 20/32; G06F 3/0482
See application file for complete search history.

(56) References Cited

U.S. PATENT DOCUMENTS

2009/0276347 A1* 11/2009 Kargman ............... G06Q 20/32
705/35
2014/0172472 A1* 6/2014 Florimond ............. G06Q 10/02
705/5

(Continued)

OTHER PUBLICATIONS

TransferWise, This is how you should use your US Visa card overseas; https://transferwise.com/us/blog/using-visa-card-abroad (Year: 2017).*

(Continued)

*Primary Examiner* — Elizabeth H Rosen
*Assistant Examiner* — Amanulla Abdullaev

(57) ABSTRACT

Disclosed is an authorisation management server for managing temporary transaction authorisation credentials. A processor of the server is operative with program instructions to (i) receive a temporary authorisation code initiator from a bookings system, the temporary authorisation code initiator indicating that a user of a payment vehicle has made a booking relating to overseas travel and identifying at least one of the user and the payment vehicle. The processor is further operative with the program instructions to (ii) acquire, from the bookings system, travel booking details for the booking, the travel booking details specifying, at least first unique identifier associated with the payment vehicle user, and a first travel segment associated with the unique identifier, (iii) acquire, from the bookings system, confirmation that the travel segment has commenced, and (iv) set the first unique identifier as an authorisation code for authorising e-commerce transactions using the payment vehicle.

20 Claims, 9 Drawing Sheets

(51) Int. Cl.
*G06Q 20/40* (2012.01)
*G06Q 20/38* (2012.01)

(52) U.S. Cl.
CPC ......... *G06Q 20/385* (2013.01); *G06Q 20/405* (2013.01); *G06Q 50/30* (2013.01)

(56) References Cited

U.S. PATENT DOCUMENTS

| | | | |
|---|---|---|---|
| 2015/0161585 A1* | 6/2015 | Huster | G06Q 20/3224 |
| | | | 705/44 |
| 2015/0206143 A1* | 7/2015 | Kurian | G06Q 20/405 |
| | | | 705/44 |
| 2015/0317633 A1 | 11/2015 | Saunders | |
| 2015/0371157 A1* | 12/2015 | Jaffe | G06Q 10/1097 |
| | | | 705/6 |
| 2017/0053363 A1* | 2/2017 | Maheshwari | G06Q 50/14 |
| 2017/0091765 A1* | 3/2017 | Lloyd | G06Q 20/32 |
| 2017/0344912 A1* | 11/2017 | Magnay | G06F 3/0482 |
| 2019/0325511 A1* | 10/2019 | Taylor | G06Q 40/00 |

OTHER PUBLICATIONS

WEX Travel, Book Hotels Smarter with Virtual Cards; https://www.wexinc.com/insights/blog/wex-travel/book-hotels-smarter-with-virtual-cards/ (Year: 2015).*

Verhoef, Peter, "International Search Report & Written Opinion", International Application No. PCT/US2018/054511, dated Feb. 12, 2019, 12 pages.

* cited by examiner

AUTHORISATION MANAGEMENT SERVER FOR MANAGING AN AUTHORISATION CODE, RELATED COMPUTER PROCESS AND DEVICE NETWORK

CROSS REFERENCE TO THE RELATED APPLICATION

This application claims priority to Singapore Application No. 10201709272Q, filed Nov. 10, 2017, the entirety of which is incorporated herein by reference.

FIELD OF THE INVENTION

The present disclosure relates to an authorisation management server for managing an authorisation code. The present disclosure particularly relates to the allocation and/or management of temporary authorisation codes for use in authorising e-commerce transactions.

BACKGROUND OF THE INVENTION

International travel is becoming increasingly accessible and affordable. Many individuals are now highly mobile, regularly flying or passing between countries. It is often necessary to perform e-commerce transactions in those countries. However, such payment vehicles are often limited to being used in a particular country. This is to reduce fraud were a third party acquires payment vehicle credentials of a payment vehicle, such as the credit card number, expiry date and card verification value (CVV) of a credit card, and uses those credentials to make unauthorised transactions from a foreign country.

It is possible for an individual to enable their payment vehicle for use in transactions in foreign countries, including e-commerce transactions initiated from a foreign country. However, when an individual travels overseas they may forget to enable overseas transactions for their payment vehicle, or may similarly forget to disable overseas transactions on their return. In the former case, the individual may be unable to make payments while overseas. This problem can be exacerbated if the cardholder is unable to access telecommunications services through which overseas transactions can be enabled, or where use of those services requires prepayment. In the latter case, the payment vehicle may remain enabled and thus exposed to fraudulent transactions while the cardholder is in their home country.

It is desirable therefore to provide an alternative process by which an individual can make transactions, such as e-commerce transactions, while overseas.

SUMMARY OF THE INVENTION

In accordance with the present disclosure, there is provided an authorisation management server for managing a temporary transaction authorisation code, comprising:
  a processor; and
  a memory device in communication with the processor and storing program instructions thereon, the processor being operative with the program instructions to:
    (i) receive a temporary authorisation code initiator from a bookings system, the temporary authorisation code initiator:
      indicating that a user of a payment vehicle has made a booking relating to overseas travel; and
      identifying at least one of the user and the payment vehicle;
    (ii) acquire, from the bookings system, travel booking details for the booking, the travel booking details specifying, at least:
      a first unique identifier associated with the payment vehicle user; and
      a first travel segment associated with the unique identifier;
    (iii) acquire, from the bookings system, confirmation that the travel segment has commenced; and
    (iv) set the first unique identifier as an authorisation code for authorising e-commerce transactions using the payment vehicle.

The temporary authorisation code initiator may further indicate a destination for the first travel segment, and the processor is further operative with the program instructions to:
  determine if the payment vehicle has been enabled for making transactions at the destination; and
  perform steps (iii) and (iv) if the payment vehicle has not been enabled for making transactions at the destination.

The travel booking details may further specify a destination for the first travel segment, and the processor is further operative with the program instructions to:
  determine if the payment vehicle has been enabled for making transactions at the destination; and
  perform steps (iii) and (iv) if the payment vehicle has not been enabled for making transactions at the destination.

The authorisation management server according to any preceding claim, wherein the processor may further be operative with the program instructions to:
  determine that the first travel segment is completed; and
  disable the first unique identifier so that it can no longer be used to authorise the transaction.

Determining that the first travel segment is completed may comprise receiving a completion notification from the bookings system. Determining that the first travel segment is completed may instead comprise consulting an online register that is associated with the bookings system and specifies whether or not the travel segment is completed.

The travel booking details may further comprise:
  a second unique identifier associated with the payment vehicle user; and
  a second travel segment associated with the second unique identifier, the second travel segment being scheduled to take place later than the first travel segment,
the processor being operative with the program instructions to:
  acquire, from the bookings system, confirmation that the second travel segment has commenced; and
  set the second unique identifier as an authorisation code for authorising e-commerce transactions using the payment vehicle.

The processor may further be operative with the program instructions to disable the first unique identifier upon receiving confirmation that the second travel segment has commenced.

Also disclosed herein is a computer process for managing temporary transaction authorisation code, comprising:
  (i) receiving, at an authorisation management server, a temporary authorisation code initiator from a bookings system, the temporary authorisation code initiator:
    indicating that a user of a payment vehicle has made a booking relating to overseas travel; and
    identifying at least one of the user and the payment vehicle;
  (ii) acquiring from the bookings system, by the authorisation management server, travel booking details for the booking, the travel booking details specifying, at least:

a first unique identifier associated with the payment vehicle user; and a first travel segment associated with the unique identifier;

(iii) acquiring from the bookings system, by the authorisation management server, confirmation that the travel segment has commenced; and (iv) setting, by the authorisation management server, the first unique identifier as an authorisation code for authorising e-commerce transactions using the payment vehicle.

The temporary authorisation code initiator may further indicate a destination for the first travel segment, the method further comprising:

determining if the payment vehicle has been enabled for making transactions at the destination; and performing steps (iii) and (iv) if the payment vehicle has not been enabled for making transactions at the destination.

The travel booking details may further specify a destination for the first travel segment, the method further comprising:

determining if the payment vehicle has been enabled for making transactions at the destination; and performing steps (iii) and (iv) if the payment vehicle has not been enabled for making transactions at the destination.

The computer process may further comprise automatically sending the temporary authorisation code initiator, from the bookings system to the authorisation management server, upon payment for the booking being made using the payment vehicle.

The computer process may further comprise:

determining, by the authorisation management server, that the first travel segment is completed; and disabling the first unique identifier so that it can no longer be used to authorise the transaction.

Determining that the first travel segment is completed comprises receiving a completion notification from the bookings system. Determining that the first travel segment is completed may instead comprise consulting an online register that is associated with the bookings system and specifies whether or not the travel segment is completed.

The travel booking details may further comprise:

a second unique identifier associated with the payment vehicle user; and a second travel segment associated with the second unique identifier, the second travel segment being scheduled to take place later than the first travel segment, the computer process further comprising:

acquiring from the bookings system, by the authorisation management server, confirmation that the second travel segment has commenced; and setting, by the authorisation management server, the second unique identifier as an authorisation code for authorising e-commerce transactions using the payment vehicle.

The computer process may further comprise disabling the first unique identifier upon receiving confirmation that the second travel segment has commenced.

The computer process may further comprise receiving the booking at the bookings system, the booking being for at least one of a flight, train journey, boat journey, hire car rental and hotel stay.

Further disclosed is a device network for managing temporary transaction authorisation code, comprising:

a bookings system; and an authorisation management server for managing temporary transaction authorisation code, the authorisation management server comprising:

a processor; and a memory device in communication with the processor and storing program instructions thereon, the processor being operative with the program instructions to:

(i) receive a temporary authorisation code initiator from the bookings system, the temporary authorisation code initiator:

indicating that a user of a payment vehicle has made a booking relating to overseas travel; and identifying at least one of the user and the payment vehicle;

(ii) acquire, from the bookings system, travel booking details for the booking, the travel booking details specifying, at least:

a first unique identifier associated with the payment vehicle user; and a first travel segment associated with the unique identifier;

(iii) acquire, from the bookings system, confirmation that the travel segment has commenced; and (iv) set the first unique identifier as an authorisation code for authorising e-commerce transactions using the payment vehicle.

The processor may further be operative with the program instructions to:

determine that the first travel segment is completed; and disable the first unique identifier so that it can no longer be used to authorise the transaction.

BRIEF DESCRIPTION OF THE DRAWINGS

Some embodiments of the present invention will now be described, by way of non-limiting example only, with reference to the accompanying drawings in which.

DETAILED DESCRIPTION

Figure 1:
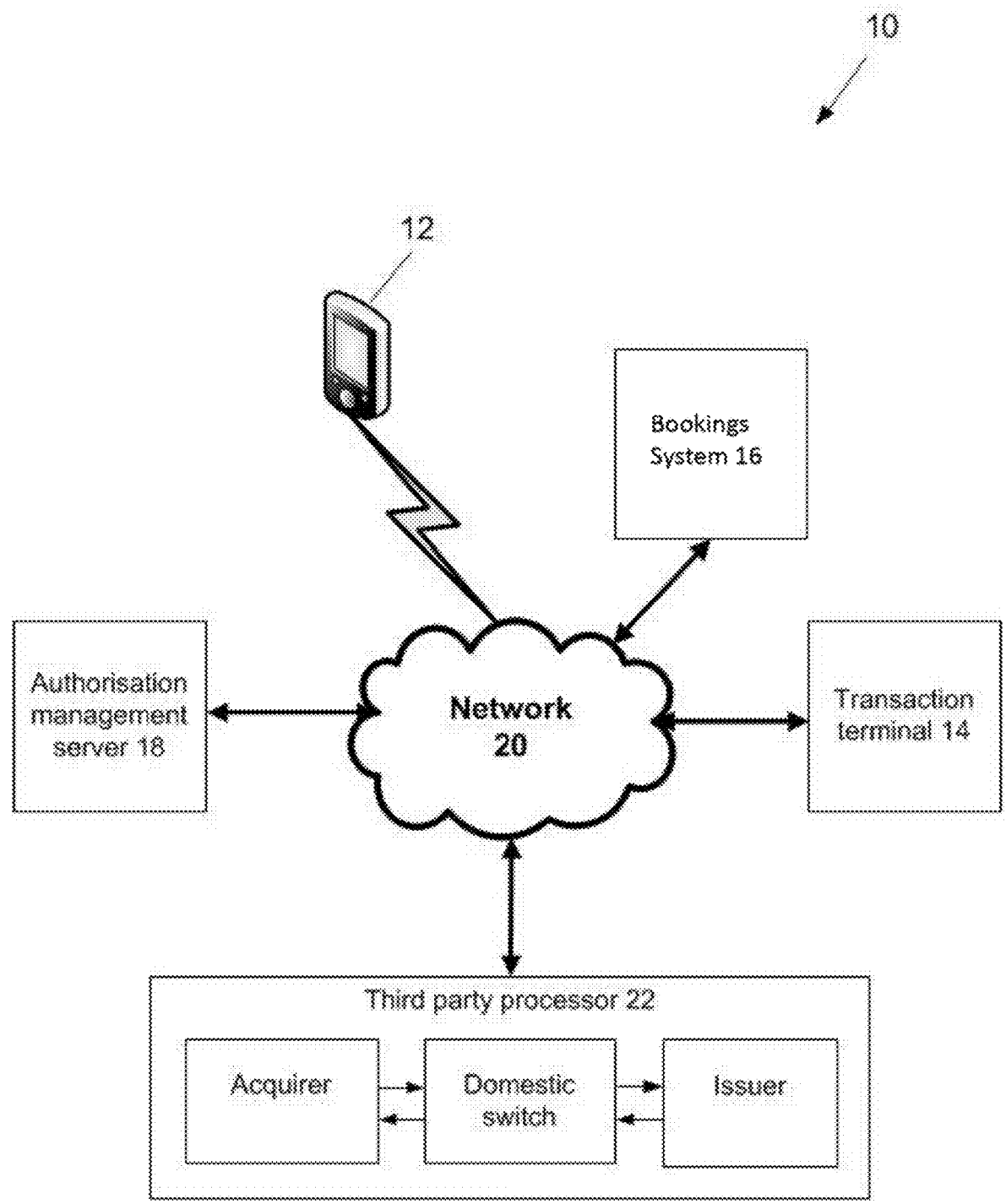
FIG. 1 is a schematic diagram of a device network for managing temporary transaction authorisation credentials.

FIG. 1 shows a device network 10 for managing temporary transaction authorisation credentials. The device network 10 enables a user of a payment vehicle (e.g. a cardholder for a debit card, credit card, pre-paid, virtual or other non-credit card or bank account) to use their payment vehicle to make e-commerce transactions while overseas irrespective of whether overseas transactions have been enabled for the payment vehicle. The device network 10, and the authorisation management server 18 in particular, generates a temporary authorisation code based on a unique identifier associated with the user, as discussed below.

In this regard, an authorisation code may be a personal identification number (PIN), password or other code by which a user or cardholder can verify their identity when making an e-commerce transaction. The device network 10 provides a mechanism for an authorisation code to be generated based on information known to the user or cardholder, without the user or cardholder needing to set up the authorisation code while in the country in which their payment vehicle was issued.

The device network 10 shown in FIG. 1 allows a user to perform e-commerce transactions while in a foreign country (i.e. a country other than that in which their payment vehicle was issued), using a temporary authorisation code to verify their identity. The device network 10 includes one or more of the following:

(a) mobile computing device 12;
(b) transaction/merchant terminal 14;
(c) bookings system 16;
(d) authorisation management server 18;
(e) network 20; and
(f) third party processor system 22.

The components 12, 14, 16, 18 and 22 of device network 10 are in communication via the network 20. The communication network 20 may include the Internet, telecommunications networks and/or local area networks.

The device network 10 enables e-commerce transactions to be performed using an authorisation code generated based on a unique identifier relating to a travel booking, such as a flight booking or hotel booking. Often, in the absence of any authorisation code, upon a user attempting to make a transaction through an e-commerce merchant, an issuer or acquirer of the user will send a One-Time Password (OTP) to the user's smartphone. The OTP is then entered into the e-commerce merchant's website or other pop-up or landing page, to verify that the person attempting to make the transaction has control of the user's smartphone and is thus the purchase is highly likely to be non-fraudulent.

When in a foreign country, potentially without access to telecommunications networks using the smartphone, the OTP may not be received. Thus, a user cannot make e-commerce transactions using that OTP. Instead, the device network 10 provides a temporary authorisation code to the user, that is activated when the user commences a travel segment of an overseas journey.

The mobile computing device 12 and the transaction terminal 14 are both terminals through which an e-commerce transaction can be placed while a cardholder is in a foreign country. Similarly, both the mobile computing device 12 and transaction terminal 14 may be used in the cardholder's home country to interact with the bookings system 16 to place the travel booking in a known manner.

Mobile computing device 12 may be any suitable device such as a smart phone, a personal data assistant (PDA), a palm-top computer, or multimedia Internet enabled cellular telephone. For ease of description, mobile computing device 12 is described below, by way of non-limiting example, with reference to a mobile device in the form of an iPhone™ manufactured by Apple™, Inc., or one manufactured by LG™, HTC™ and Samsung™, for example.

The transaction terminal 14 may also be a device similar to, or the same as, mobile computing device 12. In addition, the transaction terminal 14 may also comprise a fixed terminal such as a desktop computer or other system through which e-commerce transactions can be made, or a computer system such as that embodied by computer system 300 of FIG. 3.

Figure 2:
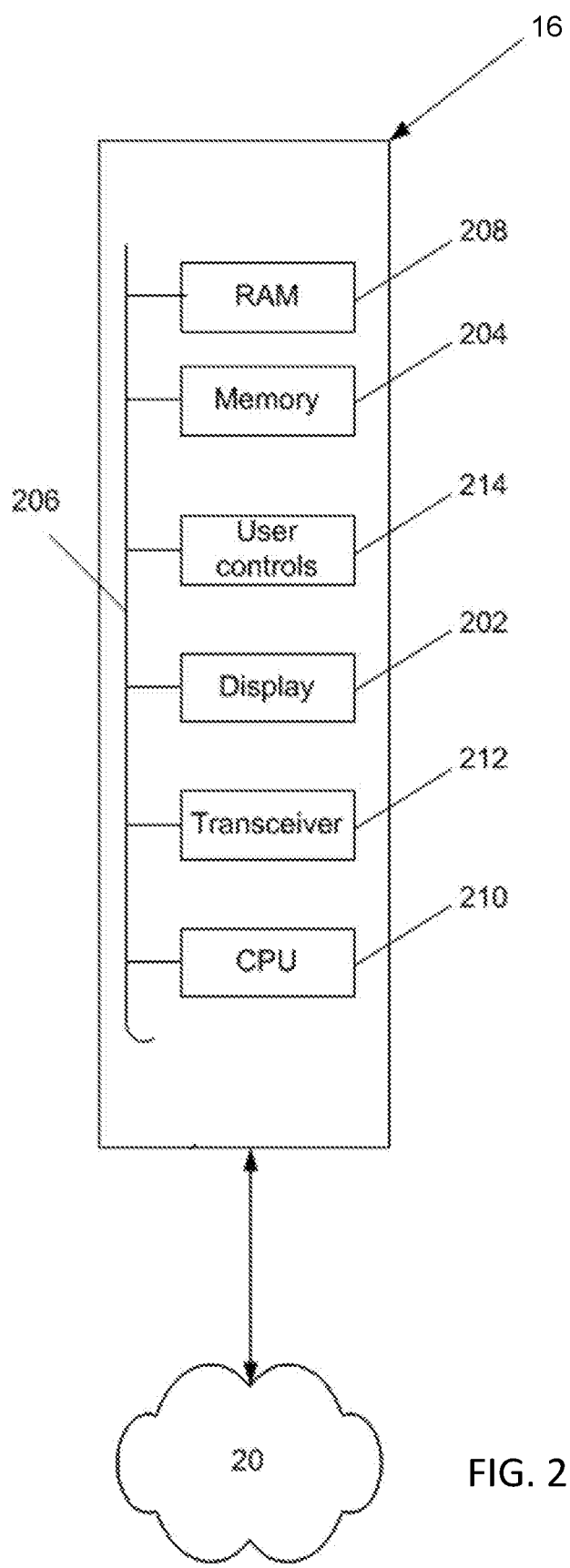
FIG. 2 is a block diagram of an example bookings system from the device network of FIG. 1.

FIG. 2 is a block diagram showing an exemplary bookings system 16 through which a travel booking can be placed. The bookings system 16 may comprise an airline booking system, a travel agent booking system, hotel booking system, car-hire system, train or boat journey booking system or any other system through which a booking can be placed for a travel segment.

Thus, the term "bookings system", and similar, refers to a computing system through which bookings are made. In addition, as described below, the bookings system is a computing system from which confirmation can be acquired that a particular travel segment has commenced and/or been completed. For example, a bookings system may be the computer network for an airline through which bookings are made and that provides or can provide updates as to whether a particular flight has departed and/or landed. Similarly, a hotel reservation system or car hire system, through which bookings can be made, may also be able to provide updates as to whether a user has checked into or out of the hotel or has picked up or dropped off the hire car.

The term "travel segment", and similar, refers to an itinerary segment such as a leg of an international flight, international train journey, international boat journey and similar, a period of time staying in a hotel or other accommodation, picking up a hire car or any other travel-related booking for which a unique booking reference is given.

As shown, the bookings system 16 includes the following components in electronic communication via a bus 206:

(a) a display 202;
(b) non-volatile (non-transitory) memory 204;
(c) random access memory ("RAM") 208;
(d) N processing components 210;
(e) a transceiver component 212 that includes N transceivers; and
(f) user controls 214.

Although the components depicted in FIG. 2 represent physical components, FIG. 2 is not intended to be a hardware diagram. Thus, many of the components depicted in FIG. 2 may be realized by common constructs or distributed among additional physical components. Moreover, it is certainly contemplated that other existing and yet-to-be developed physical components and architectures may be utilized to implement the functional components described with reference to FIG. 2.

The display 202 generally operates to provide a presentation of content to a user, and may be realized by any of a variety of displays (e.g., CRT, LCD, micro-projector and OLED displays).

In general, the non-volatile data storage 204 (also referred to as non-volatile memory) functions to store (e.g., persistently store) data and executable code.

In some embodiments for example, the non-volatile memory 204 includes bootloader code, modem software, operating system code, file system code, and code to facilitate the implementation components, well known to those of ordinary skill in the art, which are not depicted nor described for simplicity.

In many implementations, the non-volatile memory 204 is realized by flash memory (e.g., NAND or NOR memory), but it is certainly contemplated that other memory types may be utilized as well. Although it may be possible to execute the code from the non-volatile memory 204, the executable code in the non-volatile memory 204 is typically loaded into RAM 208 and executed by one or more of the N processing components 210.

The N processing components 210 in connection with RAM 208 generally operate to execute the instructions stored in non-volatile memory 204. As one of ordinarily skill in the art will appreciate, the N processing components 210 may include a video processor, modem processor, DSP, graphics processing unit (GPU), and other processing components.

The transceiver component 212 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The bookings system 16 and, similarly, the transaction terminal 14 can be accessed through mobile applications. For example, a digital wallet application, web page application, or computer application could each be accessed through the mobile computing device 12 and used, in a known way, to communication over network 20 with the transaction terminal 14 and bookings system 16 to make e-commerce transactions and travel bookings respectively.

The transceiver component 212 operates in a standard manner, to send and receive information over network 20.

It should be recognized that FIG. 2 is merely exemplary and in one or more exemplary embodiments, the functions described herein may be implemented in hardware, software, firmware, or any combination thereof. If implemented in software, the functions may be transmitted or stored as one or more instructions or code encoded on a non-transitory computer-readable medium 204. Non-transitory computer-readable medium 204 includes both computer storage medium and communication medium including any medium that facilitates transfer of a computer program from one place to another. A storage medium may be any available medium that can be accessed by a computer.

The third party processor system 22 may be a payment network including an acquirer, a payment scheme (such as Mastercard, Visa or China UnionPay) and an issuer to affect the standard four party payment methodology involving the transaction terminal 14 and/or bookings system 16.

Figure 3:
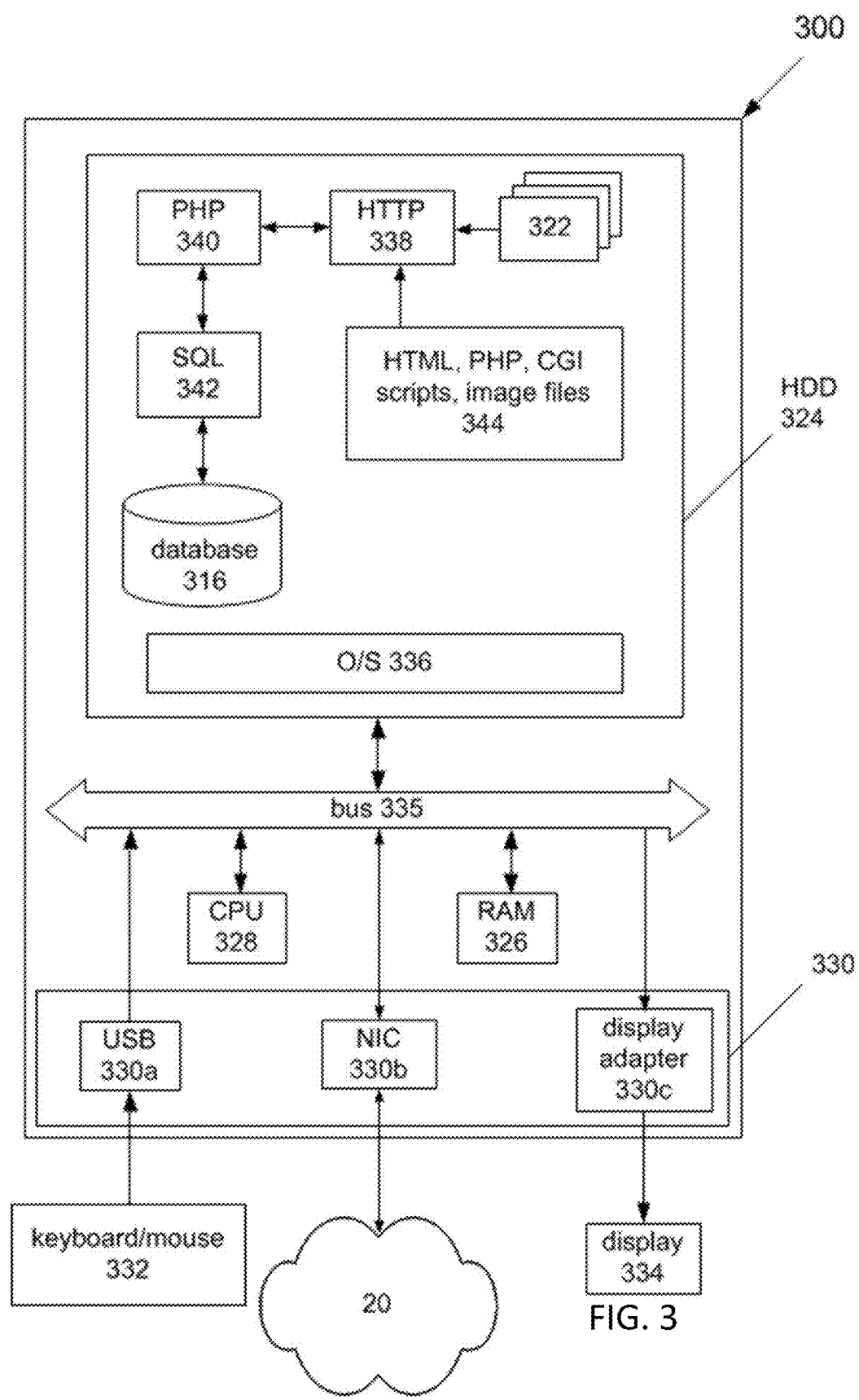
FIG. 3 is a schematic diagram showing components of an example computing device of the device network of FIG. 1.

As shown in FIG. 3, the authorisation management server 18 may comprise a system 300. In some embodiments, the system 300 may comprise multiple servers in communication with each other, for example over a local area network or a wide-area network such as the Internet. As described in the preceding section, the system 300 is able to communicate with other components of the system 10 (e.g. mobile computing device 12, bookings system 16, and third party processor 22) over the network 20 using standard communication protocols.

The components of the system 300 can be configured in a variety of ways. The components can be implemented entirely by software to be executed on standard computer server hardware, which may comprise one hardware unit or different computer hardware units distributed over various locations, some of which may require the communications network 20 for communication. A number of the components or parts thereof may also be implemented by application specific integrated circuits (ASICs) or field programmable gate arrays.

In the example shown in FIG. 3, the system 300 is a commercially available server computer system based on a 32 bit or a 64 bit Intel architecture, and the processes and/or methods executed or performed by the system 300 are implemented in the form of programming instructions of one or more software components or modules 322 stored on non-volatile (e.g., hard disk) computer-readable storage 324 associated with the system 300. At least parts of the software modules 322 could alternatively be implemented as one or more dedicated hardware components, such as application-specific integrated circuits (ASICs) and/or field programmable gate arrays (FPGAs).

The system 300 includes at least one or more of the following standard, commercially available, computer components, all interconnected by a bus 335:

(a) random access memory (RAM) 326;
(b) at least one computer processor 328, and
(c) external computer interfaces 330:
  (i) universal serial bus (USB) interfaces 330a (at least one of which is connected to one or more user-interface devices, such as a keyboard, a pointing device (e.g., a mouse 332 or touchpad),
  (ii) a network interface connector (NIC) 330b which connects the computer system 300 to a data communications network, such as the wireless communications network 20; and
  (iii) a display adapter 330c, which is connected to a display device 334 such as a liquid-crystal display (LCD) panel device.

The system 300 includes a plurality of standard software modules, including:

(a) an operating system (OS) 336 (e.g., Linux or Microsoft Windows);
(b) web server software 338 (e.g., Apache, available at http://www.apache.org);
(c) scripting language modules 340 (e.g., personal home page or PHP, available at http://www.php.net, or Microsoft ASP); and
(d) structured query language (SQL) modules 342 (e.g., MySQL, available from http://www.mysql.com), which allow data to be stored in and retrieved/accessed from an SQL database 316.

Advantageously, the database 316 forms part of the computer readable data storage 324. Alternatively, the database 316 is located remote from the server 300 shown in FIG. 3.

Together, the web server 338, scripting language 340, and SQL modules 342 provide the system 300 with the general ability to allow the other components of the system 10 to communicate with the system 300 and in particular to provide data to and receive data from the database 316. It will be understood by those skilled in the art that the specific functionality provided by the system 300 to such users is provided by scripts accessible by the web server 338, including the one or more software modules 322 implementing the processes performed by the system 300, and also any other scripts and supporting data 344, including markup language (e.g., HTML, XML) scripts, PHP (or ASP), and/or CGI scripts, image files, style sheets, and the like.

The boundaries between the modules and components in the software modules 322 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the system 300 may be executed by a module (of software modules 322) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The system 300 normally processes information according to a program (a list of internally stored instructions such as a particular application program and/or an operating system) and produces resultant output information via input/output (I/O) devices 330. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Figure 4:
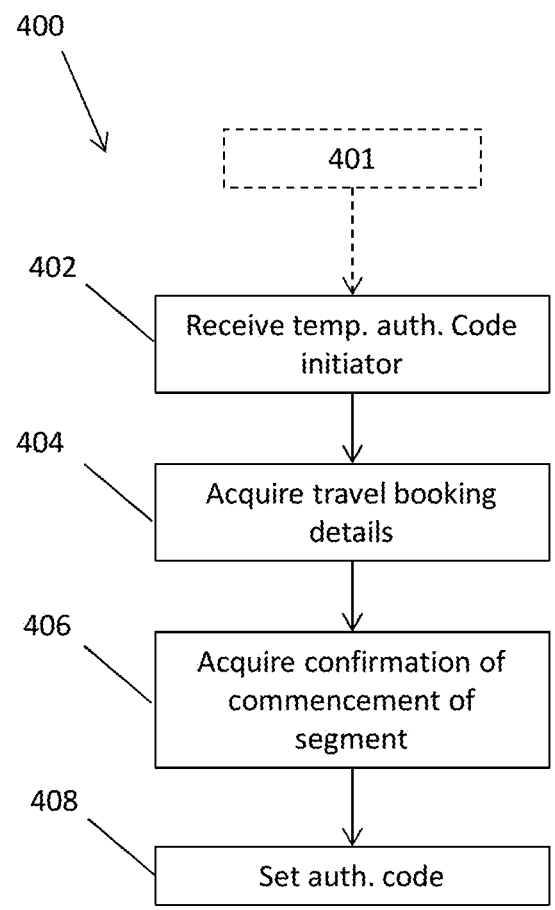
FIG. 4 illustrates a process for managing allocation of temporary authorisation code.

FIG. 4 illustrates a computer process 400 for managing temporary transaction authorisation code. The computer process 400 results in a temporary authentication code being generated for use by a user in making e-commerce transactions. The computer process broadly comprises:

Step 402: receiving a temporary authorisation code initiator;

Step 404: acquiring travel booking details;

Step 406: acquiring confirmation of commencement of travel segment; and

Step 408: setting the authorisation code.

After placement of a booking with the bookings system 16 in a known manner, and payment for the booking (step 401), the bookings system 16 sends a temporary authorisation code initiator to the authorisation management server 18. The temporary authorisation code initiator evidences payment for a travel booking for the user or cardholder.

In some embodiments, the temporary authorisation code initiator is automatically generated by the bookings system 16 and sent to the authorisation management server 18 upon payment for the booking being made using a non-cash payment vehicle, along with credentials of that payment vehicle (e.g. credit card or debit card number of a credit or debit card respectively, expiry date and card verification value (CVV)). Alternatively, the bookings system 16 may automatically generate the temporary authorisation code initiator upon a booking being made for overseas travel.

The temporary authorisation code initiator is received at the authorisation management server 18—step 402—and indicates to the authorisation management server 18 that a user of a payment vehicle has made a booking relating to overseas travel. The initiator also identifies at least one of the user, for whom the booking was made, and the payment vehicle used to pay for the booking.

Where a travel booking has been made using the payment vehicle for which a temporary authorisation code is desired, then the payment vehicle credentials of the payment vehicle can be readily ascertained from the transaction details. Where it is uncertain whether the payment vehicle used in making the booking is the payment vehicle for which a temporary authentication code is desired, the bookings system 16 may extract booking information from the booking sufficient to identify the user. This enables the authorisation management server 18 to identify the party to whom the temporary authorisation code should be allocated.

The temporary authorisation code initiator may further indicate a destination for the first travel segment or of each travel segment. This may be achieved by specifically identifying the country or countries to which the user intends to travel, by specifying the port (airport, passenger boat port, train station) at the destination for the first travel segment, or for each travel segment. The process 400 therefore comprises the optional step of determining if the payment vehicle has been enabled for making transactions at the destination or at each destination (step 410) (not shown in FIG. 4). This may involve the authorisation management server 18 requesting confirmation from the third party processor 22 (which may include the acquirer for, or issuer of, the payment vehicle) that the payment vehicle has been enabled for overseas transactions, or has been enabled for overseas transactions in one or more particular countries/destinations. The authorisation management server 18 then receives a notification from the third party processor 22 advising whether or not the payment vehicle has been enabled for making overseas transactions or overseas transactions in particular countries/destinations.

If the payment vehicle has not been enabled for making transactions at the destination(s), the authorisation management server 18 performs the remaining steps of the process 400, including steps 406 and 408. Conversely, where the making of such transaction has been enabled, the remaining steps need not be undertaken.

In addition, some payment vehicle issuers and acquirers permit a user or cardholder to specify the period over which their payment vehicle will be activated for overseas usage. The temporary authorisation code initiator may therefore specify the period of travel. The period of travel may be the dates and/or times between which:

the user is expected to be overseas;

the user is expected to be in a particular overseas country; or the user is expected to be in each particular country of a multi-country journey as discussed with reference to the provision or receipt of travel booking details in step 404.

The authorisation management server 18 then acquires travel booking details from the bookings system—step 404. The acquisition step may be a passive process by which the bookings system 16 simply sends travel booking details to the authorisation management server 18. Alternatively, the authorisation management system 18 may send a request to the bookings system 16, requesting particular travel booking details.

The travel booking details form the basis, or part of the basis, for identifying or generating a temporary authorisation code. The booking details specify a first unique identifier associated with the payment vehicle user and a first travel segment associated with the unique identifier and these are used to find or request additional information (if necessary), and also to formulate or build the temporary authorisation code.

The booking received by the bookings system 16 may be one, or a combination, of a flight, train journey, boat journey, hire car rental and hotel stay or any other booking. Taking the example of a flight, or a train or boat journey with allocated seating/room, the relevant bookings details will include the user's—in this case the traveler's—name along with any unique information applying to the user for the travel segment which, in these cases, is the outgoing (i.e. away from the country of origin) flight, train or boat leg of the journey. The unique information may comprise the user's booking reference for the travel segment, as issued by the airline, train or boat carrier. The unique information may instead comprise the user's seat or room number, or a combination of the seat or room number and the booking reference.

Where there are multiple legs—a leg constitutes a fixed subsegment of the journey between boarding/hiring and disembarking/returning the aeroplane, boat, train, hotel, hire car etc—in an outgoing journey, the authorisation management server 18 may treat these as individual travel segments and simply pick travel booking details for one of the legs to use as the authorisation code. The authorisation management server 18 may use the travel booking details for the first leg that results in the user leaving their home country— i.e. where the first leg results in the user catching a train to the airport and the second leg, from the airport overseas, is the first leg resulting in the user leaving their home country. Thus the travel booking details for the second leg are used in generating the temporary authorisation code. The authorisation management server 18 may instead use the travel booking details from the final leg or segment of the outgoing journey. The authorisation management server 18 may also update the temporary authorisation code for each leg as a new leg commences and a previous leg is completed. In addition, some carriers or airlines and other travel services providers (hotels, boat carriers, train carriers, hire car companies etc) may not wish or be able to cooperate in sending booking references and seat numbers, room numbers, hire car license plates etc to the authorisation management server 18. Thus the authorisation management server 18 may use the travel booking details for only the travel services provider that is willing and able to send those details to the authorisation management server 18, for the first or last of those providers according to the sequence in which successive legs of a multiple leg journey are undertaken as discussed above, or may update for each relevant travel services provider as their services are employed in the relevant legs of the journey.

The authorisation management server 18 may thus acquire travel booking details, and thus allocate temporary authorisation codes, depending on any desired scheme. For example, a single code may be allocate for the entire overseas journey, a new code may be allocated for only a particular country(ies) which may be useful in cases payment vehicle activation is not permitted in some countries, or may be allocated for each successive country in a multi-country journey.

In addition to the travel booking details set out above, namely the user's name, the booking reference and, in some embodiments, the seat, room or license plate number, the travel booking details may specify a destination for the first travel segment or for each travel segment in a similar manner to that discussed above in respect of the temporary authorisation code initiator of step 402.

The authorisation management server 18 may, based on the destination, determine if the payment vehicle has been enabled for making transactions at the destination (step 410). This may be achieved by requesting confirmation from the third party processor 22 as discussed with reference to step 402. The network 10 may then only implement or perform the remaining steps of process 400, including steps 406 and 408, if the payment vehicle has not been enabled for making transactions at the destination.

At the same time as step 404, or after step 404, the authorisation management server 18 acquires, from the bookings system, confirmation that the travel segment has commenced—step 406. This confirmation may comprise a confirmation notification received from the bookings system 16. The bookings system 16 may directly send the confirmation notification to the authorisation management server 18 upon departure and/or arrival (e.g. of a flight, train or boat journey), upon check-in and/or check-out from a hotel or other accommodation, on pick-up and/or drop-off of a hire car, or similar, in relation to a particular travel segment. This may involve the bookings system 16 forwarding an email that is scanned by the authorisation management server in order to extract information confirming that the travel segment has commenced, or similarly confirming that travel segment has ended. Other processes for sending data between machines to facilitate automatic reading of the data by a destination machine (e.g. the authorisation management server) will be apparent to the skilled person and may also be used in light of the present teachings.

Alternatively, a confirmation notification may be sent indirectly from the booking system to the authorisation management server. For example, an airline control system may record the departure of a plane and forward notification of the departure to a travel agent through whom the booking was made, and the travel agent may then forward that notification to the authorisation management server. Thus the bookings system may comprise multiple interacting competing systems, such as a travel agent's computing system and airline system or hotel booking system.

In addition, the authorisation management server 18 may consult an online database to determine if a particular travel segment has commenced or been completed. For example, many airlines and airports regularly update their websites to inform people of whether or not a particular flight has taken off or landed. The authorisation management server 18 may consult such a website to determine when the relevant travel segment has commenced, and thus enable the temporary authorisation code. Similarly, the authorisation management server 18 may consult such a website to determine when the relevant travel segment has ended or completed, and thus disable the temporary authorisation code.

Once confirmation is received of the commencement of the travel segment, the authorisation management server 18 sets the unique identifier (e.g. booking reference or booking reference and seat, room or license plate number) as an authorisation code for authorising e-commerce transactions using the payment vehicle—step 408. In some cases, such as where a payment vehicle used to make the booking is not a payment vehicle for which temporary authorisation codes are permissible (e.g. a bank account may not be able to be allocated a temporary authorisation code in some circumstances), the temporary authorisation code may be associated with the user. Thus the user may use the same temporary authorisation code for making transactions using each of their payment vehicles by which e-commerce transactions can be usually made—e.g. a credit, debit or pre-paid card. Alternatively, with a payment vehicle credentials are known (i.e. credit card details has been used to make the booking) and the temporary authorisation code can be associated with the payment vehicle and will thus not be active on other payment vehicle is associated with the same user.

The user or cardholder may be advised of the temporary authorisation code before the travel segment commences. For example, even in cases where a booking reference or seat, room or license plate number are allocated shortly before, or at, commencement of the travel segment the user may be advised in advance that their temporary authorisation code will be their "booking reference+seat number"—for example, for a booking reference B8KJQ6 and seat number 49A, the temporary authorisation code may be B8KJQ649A.

The user or cardholder may alternatively be advised of their temporary authorisation code after commencement of the travel segment. This may be achieved through forwarding a notification from the authorisation management server 18 to a mobile computing device 12 of the user or cardholder, or by sending the user or cardholder an email containing the temporary authorisation code to an email registered in conjunction with the payment vehicle with the third party processor 22 (e.g. issuer or acquirer) or with the authorisation management system 18.

Figure 5:
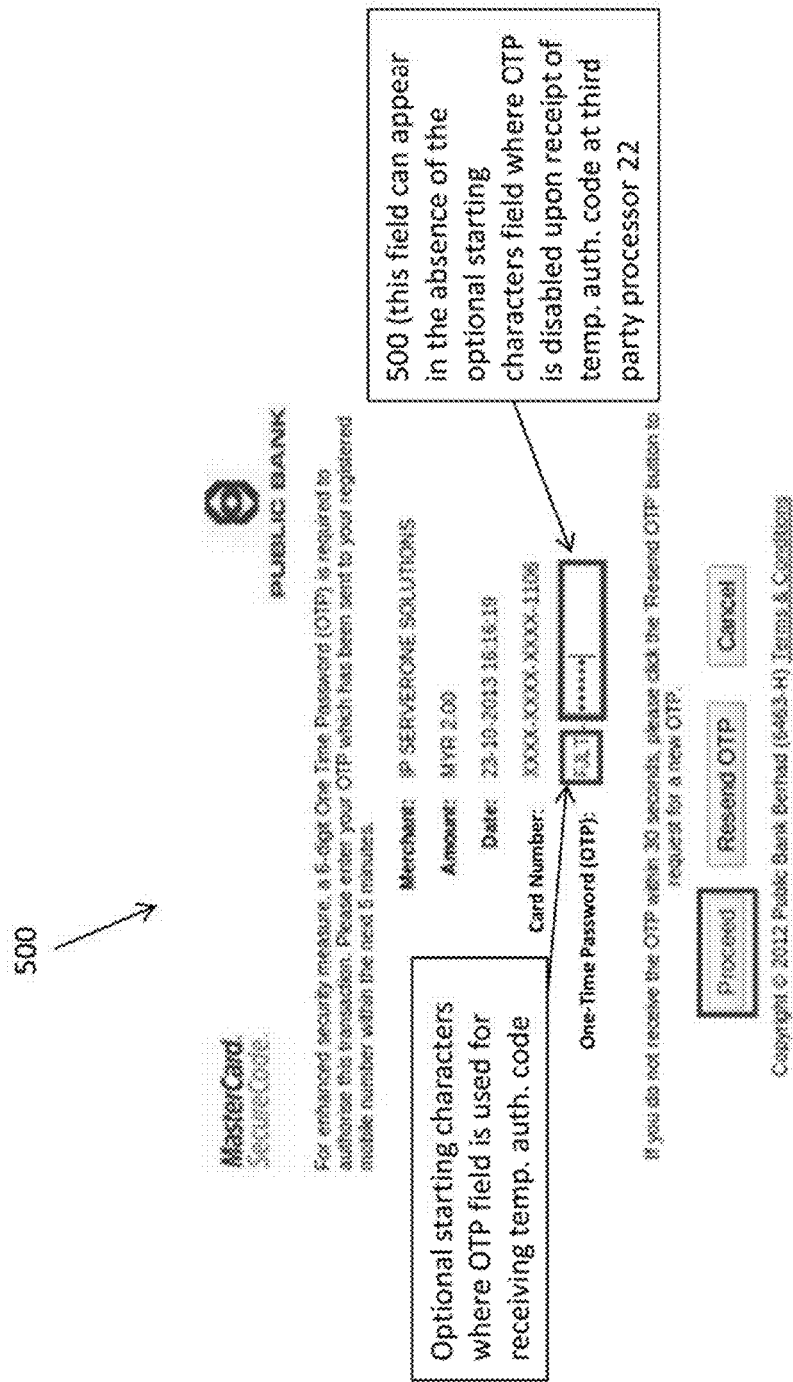
FIG. 5 illustrates an example interface showing an input field for a temporary authorisation code.

When a user of cardholder attempts to make a transaction using the payment vehicle while overseas, they will be prompted to input the temporary authorisation code into an input field. An example input field 500 is shown in FIG. 5, for a merchant website purchase via a payment gateway 502. It will be appreciated that a similar field could be implemented in an e-commerce merchant app on a mobile computing device 12, via a digital wallet app in a mobile device such that the digital wallet app sends the temporary authorisation code, along with payment vehicle credentials, to a digital wallet server associated with the digital wallet app.

Notably, to facilitate integration with existing systems, the temporary authorisation code may be used in place of the OTP. Thus field 500 can receive either the OTP (where the user's smartphone is still able to receive the OTP) and thus permit transactions to be made in a known manner. Similarly, field 500 can receive the temporary authorisation code which will be matched against an expected temporary authorisation code by the authorisation management server 18.

In some embodiments, upon setting the temporary authorisation code in accordance with step 608, the authorisation management server 18 sends a code set notification to the third party processor 22. The code set notification advises the third party processor 22 (e.g. the acquirer or issuer of the payment vehicle) that a temporary authorisation code has been set for the payment vehicle. In response to receipt of the code set notification, the third party processor 22 disables the sending of one-time passwords. In other embodiments, OTPs are still sent when transactions are initiated or made. In these embodiments, if the OTP is entered into field 500 and is thus received by the third party processor 22 then the third party processor 22 processes the transaction in the usual manner. If the code entered into field 500 is not the OTP, then the third party processor, on receipt of the code, sends it to the authorisation management server 18 that determines whether the code matches the temporary authorisation code. If so, the authorisation management server 18 sends a notification to the third party processor 22 that then authorises the transaction. In further embodiments, the authorisation management server 18 sends the temporary authorisation code to the third party processor 22 that then expect to receive either an OTP or the temporary authorisation code, or only the temporary authorisation code in cases where sending of OTPs has been disabled, when a transaction is sought to be made.

Figure 6A:
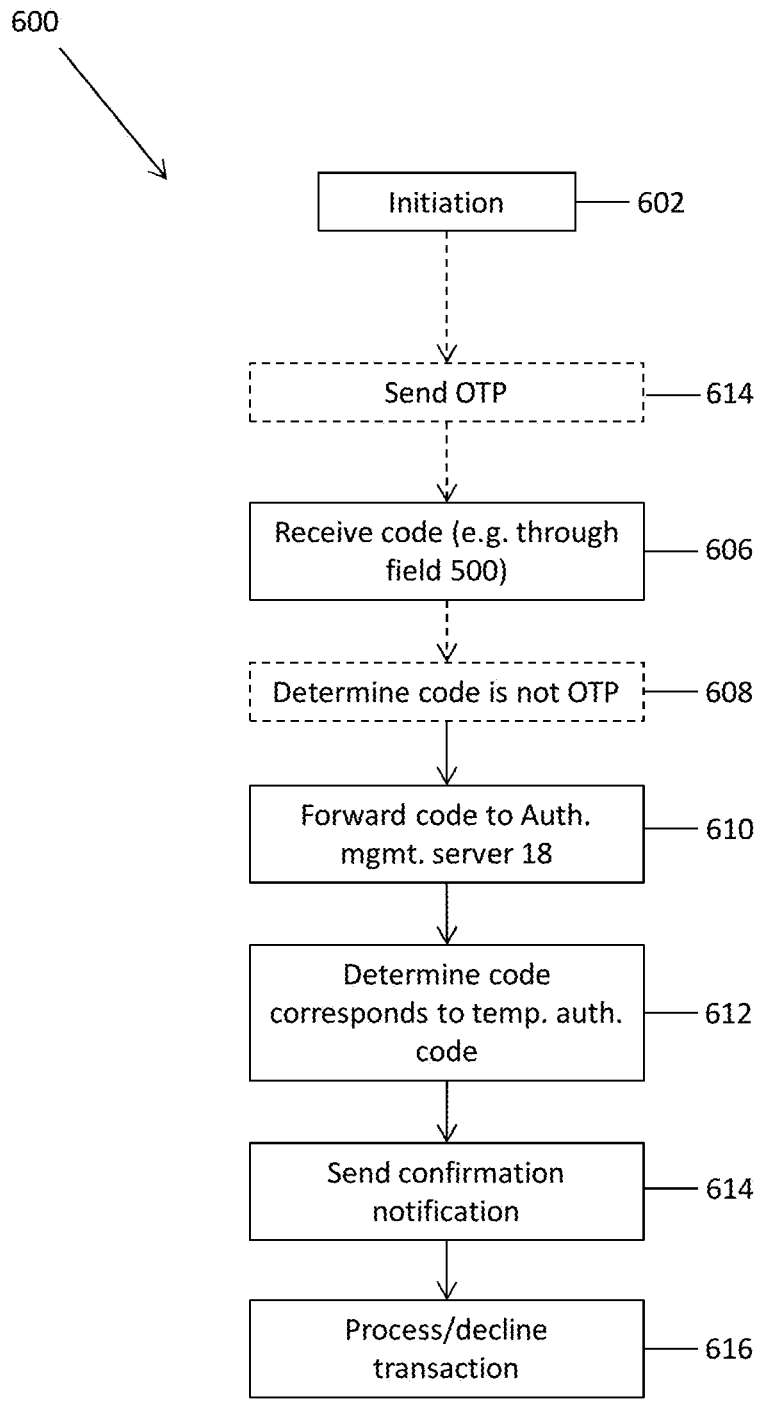
FIG. 6A illustrates a process for receiving a temporary authorisation code.

A process 600 for managing receipt of a temporary authorisation code is illustrated in FIG. 6A. The process broadly comprises:

Step 602: receiving a transaction initiation;
Step 604: sending OTP;
Step 606: receiving a code;
Step 608: determining that the code is not the OTP;
Step 610: forwarding the code to the authorisation management server 18;
Step 612: determining the code corresponds to a temporary authorisation code;
Step 614: sending confirmation notification to third party processor 22; and
Step 616: processing or declining the transaction.

Step 602 involves a standard process by which a user may click "checkout", "submit" or another button in a payment gateway or other e-commerce payment mechanism. This results in a transaction initiation notification being sent to the third party processor 22 or to the authorisation management server 18. In some embodiments, the third party processor 22 and authorisation management server 18 are the same server or processor.

In some embodiments, upon initiation of a transaction the transaction initiation notification is sent to the third party processor 22. Upon receipt of the transaction initiation notification, the third party processor 22 may send a OTP to the mobile computing device 12 of the user in accordance with known processes—step 604. A code is then entered into a field, such as field 500 of FIG. 5, and that code is subsequently sent to, and thus received by, the third party processor 22—step 606. The third party processor 22 then determines that the code is not the OTP—step 608—and forwards the code to the authorisation management server 18—step 610. Notably, where the OTP has been disabled, the third party processor 22 may, on initiation of a transaction per step 602, receive a code per step 606 and immediately send the code to the authorisation management server 18 per step 610. Thus steps 604 and 608 are not needed.

The authorisation management server 18 determines whether or not the code corresponds to a temporary authorisation code, such as the temporary authorisation code set in accordance with step 408—step 612. If the code received from the third party processor 22 does not match the temporary authorisation code, then the authorisation management server 18 sends a declination notification to the third party processor 22. The third party processor 22 then declines the transaction. If the code received from the third party processor 22, by the authorisation management server 18, does match the temporary authorisation code, then the authorisation management server 18 sends a confirmation notification to the third party processor 22—step 614. The confirmation notification confirms that the code received by the third party processor 22 matches the temporary authorisation code and thus the third party processor 22 can process the transaction—step 616.

Figure 6B:
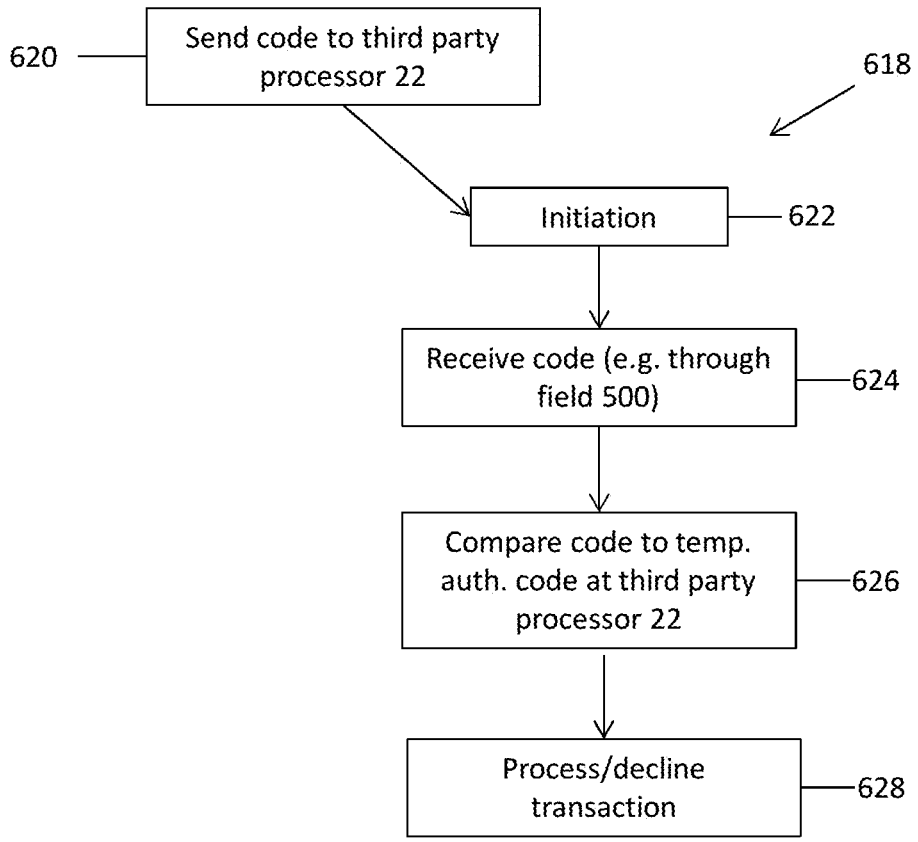
FIG. 6B illustrates a further process for receiving a temporary authorisation code.

The process 618, as shown in FIG. 6B, illustrates further processes for receiving a temporary authorisation code. Process 618 broadly comprises:

Step 620: send temporary authorisation code to third party processor 22;
Step 622: receiving a transaction initiation;
Step 624: receiving a code;
Step 626: compare code to temporary authorisation code; and
Step 628: process the transaction.

In accordance with step 620, after setting the temporary authorisation code in accordance with step 408, the authorisation management server 18 sends the temporary authorisation code to the third party processor 22. The third party processor 22 can then store the temporary authorisation code in memory. In this regard, storing a temporary authorisation code will be understood to include storing the code itself, and also to include storing a proxy for the temporary authorisation code. For example, the third party processor 22 (and similarly the authorisation management server 18) may store the output of a Hash algorithm as applied to the temporary authorisation code, or some other value.

A transaction is then initiated in accordance with step 622 and the code is received in accordance with step 624. Steps 622 and 624 are essentially the same as steps 602 and 606 (discussed above) respectively. The received code is then compared the temporary authorisation code—step 626—by the third party processor 22. This is the same process as would be performed by the authorisation management server 18 in accordance with step 612. The comparison performed in accordance with Step 626 may, for example, be a one-by-one comparison of characters, such as that performed using well-known string comparison methods. Any other method of confirming the correctness of an input may also be used—e.g. a Hash algorithm may be used and the third party processor 22 thus stores the relevant Hash value of the temporary authorisation code.

If the temporary authorisation code matches the code received by the third party processor 22, then the third party processor processes the transaction in accordance with step 628. If the code does not match the temporary authorisation code, and the third party processor 22 has not sent an OTP, or the code does not match the OTP, then the transaction is declined.

The third party processor 22 thus uses the temporary authorisation code in place of a PIN, OTP or other expected value by which it would normally confirm the identity of the party attempting to make the transaction.

Figure 6C:
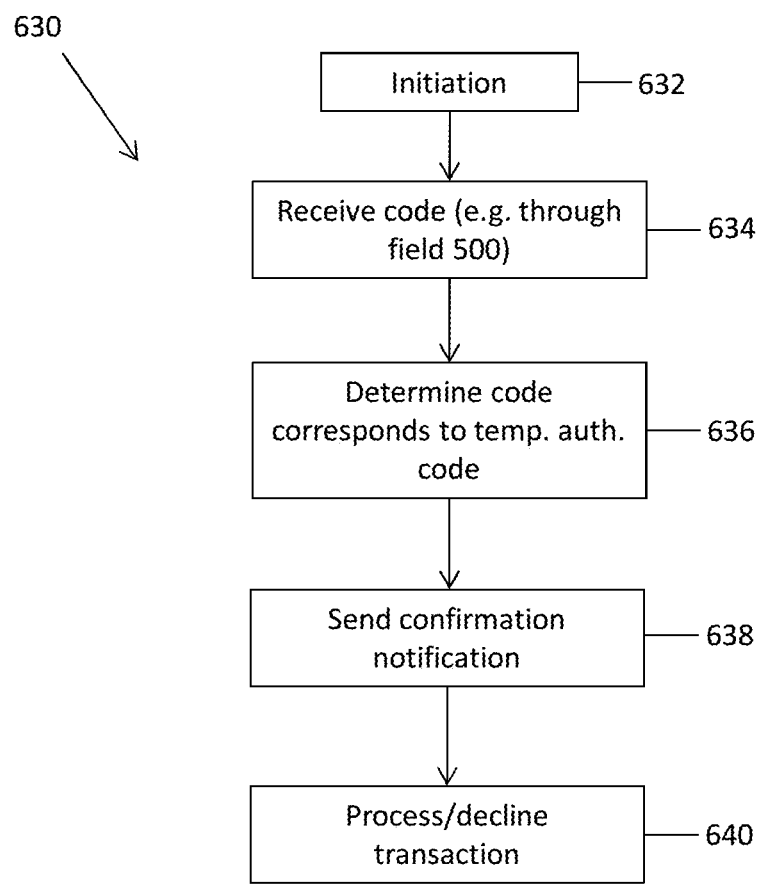
FIG. 6C illustrates yet a further process for receiving a temporary authorisation code.

The process 630, as shown in FIG. 6C, illustrates another process for receiving a temporary authorisation code. Process 630 broadly comprises:

Step 632: receiving a transaction initiation;
Step 634: receiving a code;
Step 636: compare code to temporary authorisation code;
Step 638: sending confirmation notification to third party processor 22; and
Step 640: process the transaction.

In this embodiment, authorisation management server 18 again stores the temporary authorisation code and performs the comparison of that code against the code received when the transaction is made (e.g. through field 500). Thus, the transaction initiation is received at the authorisation management server 18—step 632. Similarly, the temporary authorisation code is received at the authorisation management server 18—step 634. At step 636, the authorisation management server 18 determines if the temporary authorisation code matches the code received at step 634. If the code received at step 634 matches the temporary authorisation code then sends a confirmation notification to the third party processor 22—step 638. In some embodiments, where the authorisation management server 18 determines that the code received at step 634 does not match the temporary authorisation code, the authorisation management server 18 sends a notification to the transaction terminal 14, declining the transaction. The operations performed at steps 632, 634, 636 and 638 are discussed with reference to steps 602, 606, 612 and 614 of FIG. 6A, respectively.

In this embodiment, a payment gateway or other purchase mechanism may send transaction details (e.g. transaction value, merchant identifier and other information necessary for an issuer to process the transaction) to one or both of the third party processor 22 and the authorisation management server 18. Where the transaction details are sent to the third party process 22, the authorisation management server 18 need only send confirmation to the third party processor 22 that the code received at step 634 matches the temporary authorisation code. Where the transaction details are sent only to the authorisation management server 18, the authorisation management server 18 may send the transaction details to the third party processor 22 along with confirmation that the code received at step 634 matches the temporary authorisation code.

The third party processor 22 can then process the transaction in the usual manner and forward confirmation of success or failure of the transaction directly to the transaction terminal 14, or indirectly to the transaction terminal 14 via the authorisation management server 18—step 640. Step 640 is essentially the same as step 616 of FIG. 6A.

Figure 7:
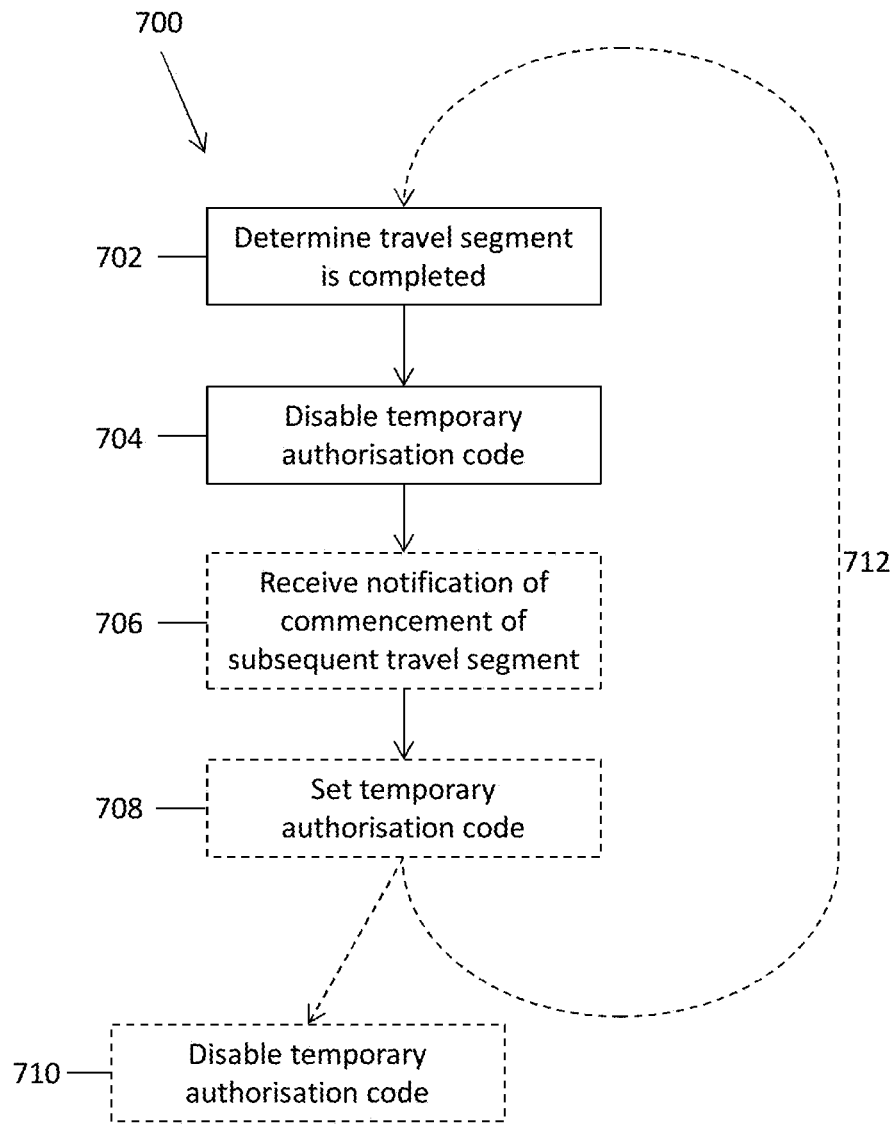
FIG. 7 illustrates a process for disabling temporary authorisation codes and issuing new temporary authorisation codes.

It will also be appreciated that upon return of the user or cardholder to their home country, or upon the user or cardholder moving to another foreign country, it may be desirable to disable the previously set temporary authorisation code. To this end, FIG. 7 illustrates steps for disabling a temporary authorisation code. Process 700 involves the authorisation management server 18 determining that a travel segment is completed—step 702—and, in response to that determination, disabling the temporary authorisation code so that it can no longer be used to authorise a transaction—step 704.

Authorisation management server 18 may determine that a travel segment is completed by receiving a completion notification from the bookings system 16 advising the authorisation management server 18 that the travel segment is completed. The authorisation management server 18 may also consult an online database, register or website, as discussed above, on which the bookings system 16 updated information as to the status of, for example, flight arrivals and departures. Thus the authorisation management server 18 can extract information from the online database, register or website from which to determine that the travel segment is completed, and thereafter disable the temporary authorisation code. Accordingly, when the user returns to their home country, the authorisation management server 18 may determine they have returned and thus disable all temporary authorisation code(s) that have been set on the user's payment vehicle(s).

In some embodiments, the bookings system 16 may send a further notification to the authorisation management server 18 advising that a second travel segment has commenced—that further notification is then received by the authorisation management server 18—step 706. Alternatively, notification can be received by the authorisation management server 18 consulting a database, register or website, or by receiving a scannable email as discussed above.

In general, a second travel segment can be considered to start after completion of the first travel segment, and so on for any number of travel segments. The travel booking details received from the bookings system 16 may contain a second unique identifier associated with the payment vehicle user, and a second travel segment associated with the second unique identifier. Thus upon receiving confirmation that the first travel segment has been completed, the authorisation management server 18 can set the second unique identifier (e.g. booking reference and/or seat number for an onward journey between foreign countries) as a temporary authorisation code for authorising e-commerce transactions using the payment vehicle—step 708. In addition, the authorisation management server 18 can disable the first temporary authorisation code (i.e. the temporary authorisation code generated based on the booking details relating to the first travel segment) when the second temporary authorisation code is enabled. Thus step 702 and step 706 may form a single step of receiving one or both of the notification that one travel segment has completed and the notification that the next travel segment has commenced. Similarly, steps 704 and 708 may form a single step so that upon disablement of one temporary authorisation code, the next temporary authorisation code is enabled. This ensures only a single temporary authorisation code is valid at any one time.

As with disabling the first temporary authorisation code, a similar process may be used (i.e. determining the second or subsequent travel segment has been completed) for the second or subsequent temporary authorisation code, so as to disable that code on completion of the second or subsequent travel segment. Arrow 712 indicates that further travel segments undertaken by the user, and further temporary authorisation codes may be set according to the travel booking details for those further travel segments.

As discussed above, the present invention uses temporary information about a user or cardholder travel itinerary (travel segments) to facilitate authorisation of e-commerce transactions while the user or cardholder is in a foreign country. The temporary authorisation code may take the place of a single code, a role such as that provided by an OTP issued for home country transactions, or may take the place of multiple inputs that together form a code, such as a login and password or other combination of information. Thus the authorisation code may comprise 2 pieces of information, such as a booking reference and seat, room or license plate number that are inputted into separate fields in a payment gateway or other payment mechanism afforded by e-commerce merchants.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge.

The invention claimed is:

1. An authorisation management server for managing a temporary transaction authorisation code, comprising:
   a processor; and
   a memory device in communication with the processor and storing program instructions thereon, the processor being operative with the program instructions to:
   (i) receive a temporary authorisation code initiator from a computing system of a bookings system through which bookings are made, the temporary authorisation code initiator:
      indicating that a user of a payment vehicle has made a booking relating to travel to at least one foreign country; and
      identifying at least one of the user of the payment vehicle and the payment vehicle;
   (ii) acquire, from the computing system of the bookings system, travel booking details for the booking, the travel booking details specifying, at least:
      a first unique identifier associated with the user of the payment vehicle; and
      a first travel segment associated with the first unique identifier;
   (iii) acquire, from the computing system of the bookings system, confirmation that the first travel segment has commenced;
   (iv) set the first unique identifier as a temporary authorisation code for authorising e-commerce transactions using the payment vehicle during the first travel segment in the at least one foreign country; and
   (v) receive the temporary authorisation code, from an application in a mobile computing device of the user of the payment vehicle, while making an e-commerce transaction using the payment vehicle during the first travel segment in the at least one foreign country.

2. The authorisation management server according to claim 1, wherein the temporary authorisation code initiator further indicates a destination for the first travel segment, and the processor is further operative with the program instructions to:
   determine if the payment vehicle has been enabled for making transactions at the destination; and
   perform steps (iii) and (iv) if the payment vehicle has not been enabled for making transactions at the destination.

3. The authorisation management server according to claim 1, wherein the travel booking details further specify a destination for the first travel segment, and the processor is further operative with the program instructions to:
   determine if the payment vehicle has been enabled for making transactions at the destination; and
   perform steps (iii) and (iv) if the payment vehicle has not been enabled for making transactions at the destination.

4. The authorisation management server according to claim 1, wherein the processor is further operative with the program instructions to:
   determine that the first travel segment in the at least one foreign country is completed; and
   upon determining that the first travel segment in the at least one foreign country is completed, disable the first unique identifier so that it can no longer be used to authorise a transaction.

5. The authorisation management server according to claim 4, wherein determining that the first travel segment in the at least one foreign country is completed comprises at least one of:
   receiving a completion notification from the bookings system; and
   consulting an online register that is associated with the bookings system and specifies whether or not the first travel segment in the at least one foreign country is completed.

6. The authorisation management server according to claim 1, wherein the processor is further operative with the program instructions to:
   associate the temporary authorisation code with the user of the payment vehicle; and
   use the temporary authorisation code for making e-commerce transactions during the first travel segment using a different payment vehicle from the payment vehicle used for making the booking related to travel to the at least one foreign country.

7. The authorisation management server according to claim 1, wherein the travel booking details further comprise:
   a second unique identifier associated with the user of the payment vehicle; and
   a second travel segment associated with the second unique identifier, the second travel segment being scheduled to take place later than the first travel segment in the at least one foreign country,
the processor being operative with the program instructions to:

acquire, from the computing system of the bookings system, confirmation that the second travel segment has commenced; and set the second unique identifier as an authorisation code for authorising e-commerce transactions using the payment vehicle during the second travel segment in the at least one foreign country.

8. The authorisation management server according to claim 7, wherein the processor is further operative with the program instructions to disable the first unique identifier upon receiving confirmation that the second travel segment has commenced.

9. A computer process for managing temporary transaction authorisation code, comprising:
(i) receiving, at an authorisation management server, a temporary authorisation code initiator from a computing system of a bookings system through which bookings are made, the temporary authorisation code initiator:
  indicating that a user of a payment vehicle has made a booking relating to travel to at least one foreign country; and
  identifying at least one of the user of the payment vehicle and the payment vehicle;
(ii) acquiring from the computing system of the bookings system, by the authorisation management server, travel booking details for the booking, the travel booking details specifying, at least:
  a first unique identifier associated with the user of the payment vehicle; and
  a first travel segment associated with the first unique identifier;
(iii) acquiring from the computing system of the bookings system, by the authorisation management server, confirmation that the first travel segment has commenced;
(iv) setting, by the authorisation management server, the first unique identifier as a temporary authorisation code for authorising e-commerce transactions using the payment vehicle during the first travel segment in the at least one foreign country; and
(v) receiving the temporary authorisation code, from an application in a mobile computing device of the user of the payment vehicle, while making an e-commerce transaction using the payment vehicle during the first travel segment in the at least one foreign country.

10. The computer process for managing temporary authorisation code according to claim 9, wherein the temporary authorisation code initiator further indicates a destination for the first travel segment, the method further comprising:
determining if the payment vehicle has been enabled for making transactions at the destination; and
performing steps (iii) and (iv) if the payment vehicle has not been enabled for making transactions at the destination.

11. The computer process for managing temporary authorisation code according to claim 9, wherein the travel booking details further specify a destination for the first travel segment, the method further comprising:
determining if the payment vehicle has been enabled for making transactions at the destination; and
performing steps (iii) and (iv) if the payment vehicle has not been enabled for making transactions at the destination.

12. The computer process for managing temporary authorisation code according to claim 9, further comprising automatically sending the temporary authorisation code initiator, from the computing system of the bookings system to the authorisation management server, upon payment for the booking being made using the payment vehicle.

13. The computer process for managing temporary authorisation code according to claim 9, further comprising:
determining, by the authorisation management server, that the first travel segment in the at least one foreign country is completed; and
upon determining that the first travel segment in the at least one foreign country is completed, disabling the first unique identifier so that it can no longer be used to authorise a transaction.

14. The computer process for managing temporary authorisation code according to claim 13, wherein determining that the first travel segment in the at least one foreign country is completed comprises at least one of:
receiving a completion notification from the bookings system; and
consulting an online register that is associated with the bookings system and specifies whether or not the first travel segment in the at least one foreign country is completed.

15. The computer process for managing temporary authorisation code according to claim 9, further comprising sending, by the authorisation management server, a code set notification to a third party processor associated with the payment vehicle to disable sending a one-time password (OTP) during the first travel segment in the at least one foreign country.

16. The computer process for managing temporary authorisation code according to claim 9, wherein the travel booking details further comprise:
a second unique identifier associated with the user of the payment vehicle; and
a second travel segment associated with the second unique identifier, the second travel segment being scheduled to take place later than the first travel segment in the at least one foreign country,
the computer process further comprising:
acquiring from the computing system of the bookings system, by the authorisation management server, confirmation that the second travel segment has commenced; and
setting, by the authorisation management server, the second unique identifier as an authorisation code for authorising e-commerce transactions using the payment vehicle during the second travel segment in the at least one foreign country.

17. The computer process for managing temporary authorisation code according to claim 16, further comprising disabling the first unique identifier upon receiving confirmation that the second travel segment has commenced.

18. The computer process for managing temporary authorisation code according to claim 9, further comprising receiving the booking at the computing system of the bookings system, the booking being for at least one of a flight, train journey, boat journey, hire car rental and hotel stay.

19. A device network for managing temporary transaction authorisation code, comprising:
a computing system of a bookings system; and
an authorisation management server for managing temporary transaction authorisation code, the authorisation management server comprising:
a processor; and a memory device in communication with the processor and storing program instructions thereon, the processor being operative with the program instructions to:
(i) receive a temporary authorisation code initiator from the computing system of the bookings system, the temporary authorisation code initiator:
  indicating that a user of a payment vehicle has made a booking relating to travel to at least one foreign country; and
  identifying at least one of the user of the payment vehicle and the payment vehicle;
(ii) acquire, from the computing system of the bookings system, travel booking details for the booking, the travel booking details specifying, at least:
  a first unique identifier associated with the user of the payment vehicle; and
  a first travel segment associated with the first unique identifier;
(iii) acquire, from the computing system of the bookings system, confirmation that the first travel segment has commenced;
(iv) set the first unique identifier as an authorisation code for authorising e-commerce transactions using the payment vehicle during the first travel segment in the at least one foreign country; and
(v) receive the authorisation code, from an application in a mobile computing device of the user of the payment vehicle, while making an e-commerce transaction using the payment vehicle during the first travel segment in the at least one foreign country.

20. The device network according to claim 19, wherein the authorisation management server includes a web server and the program instructions include a scripting language module, wherein the processor is further operative with the program instructions to:
determine that the first travel segment in the at least one foreign country is completed; and
upon determining that the first travel segment in the at least one foreign country is completed, disable the first unique identifier so that it can no longer be used to authorise a transaction.

* * * * *